United States Patent [19]

Yajima

[11] Patent Number: 4,864,271
[45] Date of Patent: Sep. 5, 1989

[54] PRESSURE SENSOR

[75] Inventor: Yasuhito Yajima, Nagoya, Japan

[73] Assignee: NGK Insulators, Ltd., Nagoya, Japan

[21] Appl. No.: 197,312

[22] Filed: May 23, 1988

[30] Foreign Application Priority Data

May 26, 1987 [JP] Japan .................. 62-129360

[51] Int. Cl.$^4$ ................................ G01L 1/22
[52] U.S. Cl. ........................ 338/4; 338/36; 338/5
[58] Field of Search ............ 338/2, 3, 4, 5, 308, 338/306, 307, 36; 73/862.64, 862.65; 361/283

[56] References Cited

U.S. PATENT DOCUMENTS

| | | | |
|---|---|---|---|
| 4,068,206 | 1/1978 | Popp | 338/36 |
| 4,178,621 | 12/1979 | Simonelic et al. | 361/283 |
| 4,311,980 | 1/1982 | Prudenziati | 338/4 |
| 4,380,041 | 4/1983 | Ho | 361/283 |
| 4,431,981 | 2/1984 | Fuller et al. | 338/36 X |
| 4,481,497 | 11/1984 | Kurtz et al. | 338/2 |
| 4,507,973 | 4/1985 | Barr et al. | 73/724 |
| 4,695,504 | 9/1987 | Watanabe et al. | 338/308 X |
| 4,782,319 | 11/1988 | Dell'Acqua et al. | 338/4 |

OTHER PUBLICATIONS

Dell Acqua et al., "Characteristics and Performances of Thick-Film Pressure Sensors for Automatic Applications", SAE Technical Paper Series, (Feb. 1982).
Dell Acqua et al., "High Pressure Thick-Film Monolithic Sensors," Sensors and Actuators; (Feb. 1986).
Cattaneo et al., "Low Cost Thick-Film Pressure Sensor", 800023, Society of Automotive Engineers, (1980).

Primary Examiner—E. A. Goldberg
Assistant Examiner—M. M. Lateef
Attorney, Agent, or Firm—Arnold, White & Durkee

[57] ABSTRACT

A pressure sensor including a ceramic diaphragm which is deformable in response to a pressure applied thereto, a ceramic base associated with a periphery of the ceramic diaphragm, for supporting the ceramic diaphragm, and at least one resistor formed on the ceramic diaphragm. Resistance value of the resistor are adapted to vary depending upon a magnitude of deformation of the ceramic diaphragm, and thereby represent the pressure applied to the ceramic diaphragm. The ceramic diaphragm and the ceramic base consist of a co-fired body obtained by co-firing an unfired diaphragm member and an unfired base member.

9 Claims, 4 Drawing Sheets

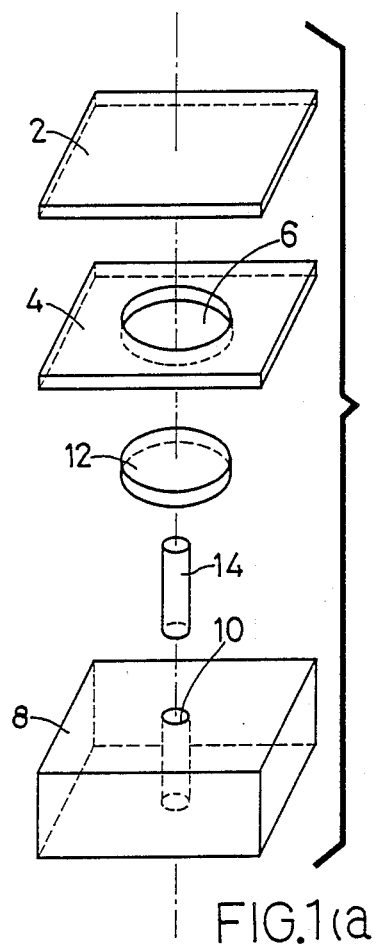
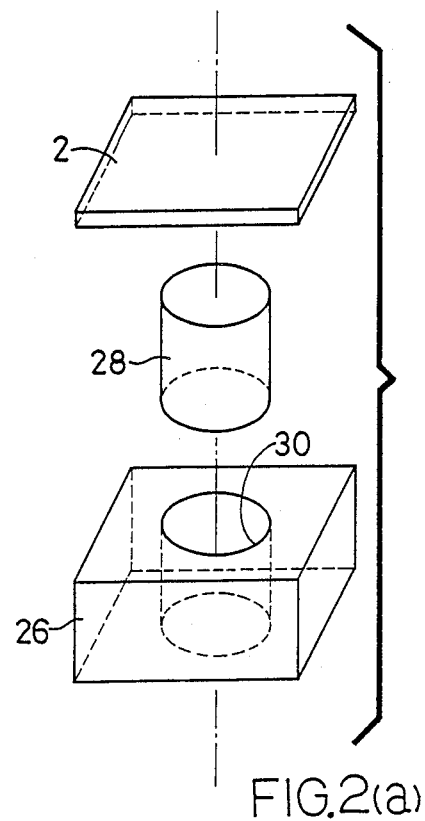
FIG.1(a)
FIG.2(a)
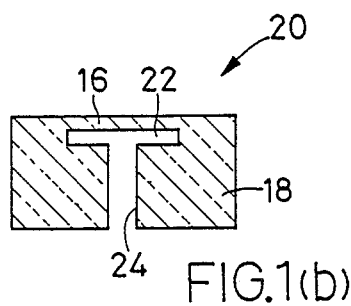
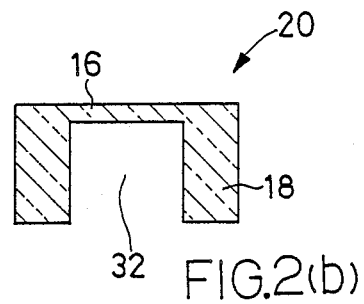
FIG.1(b)
FIG.2(b)

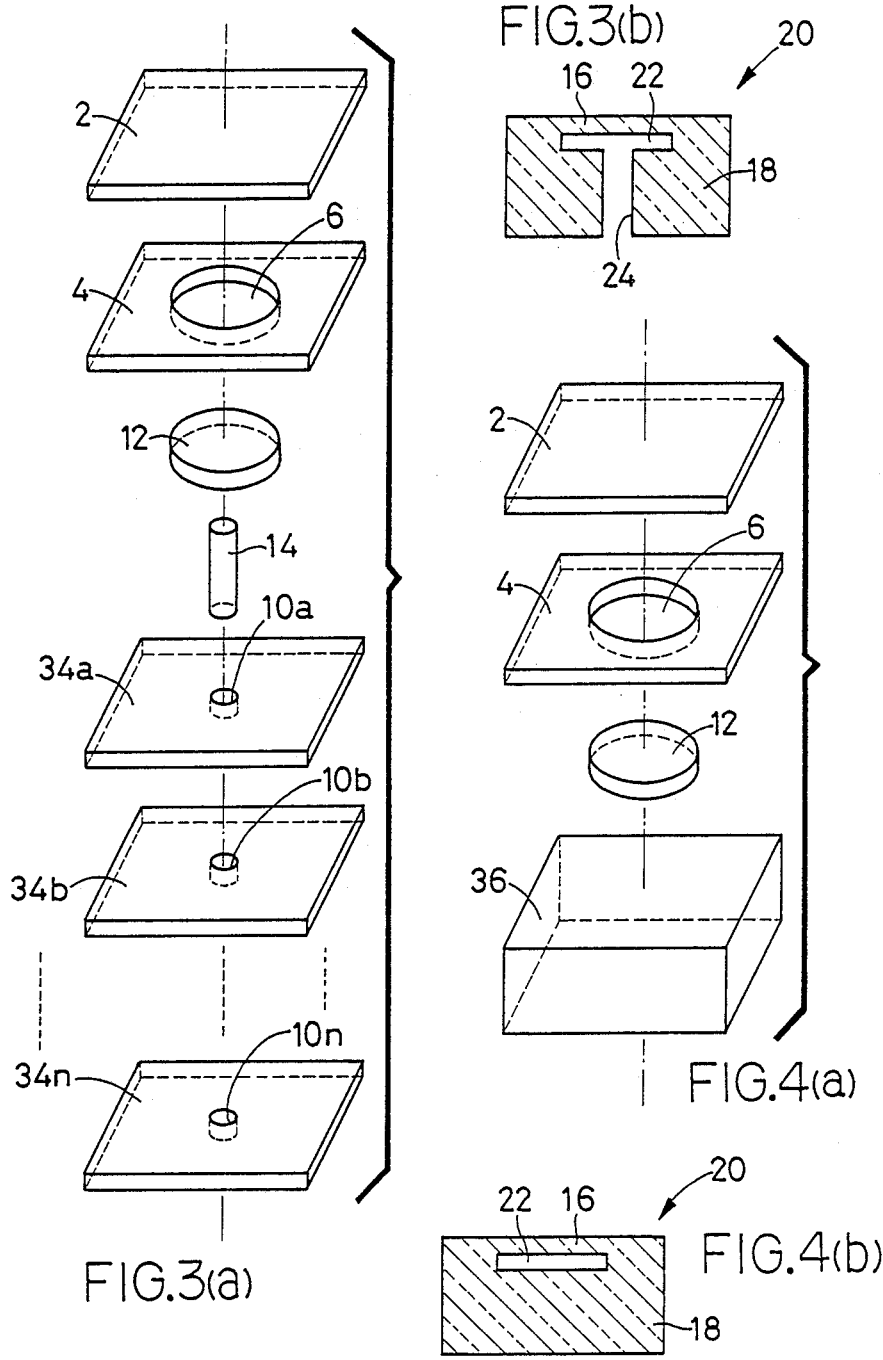

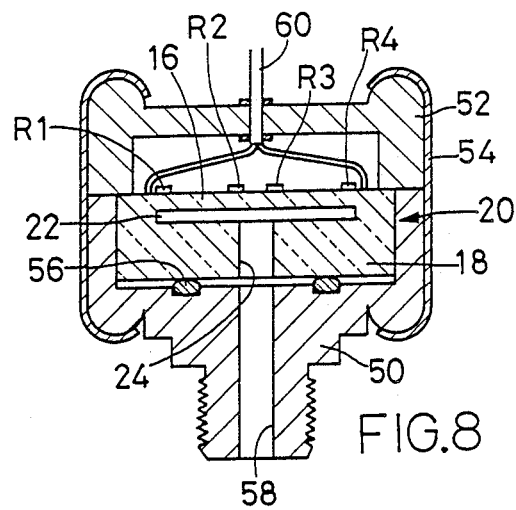
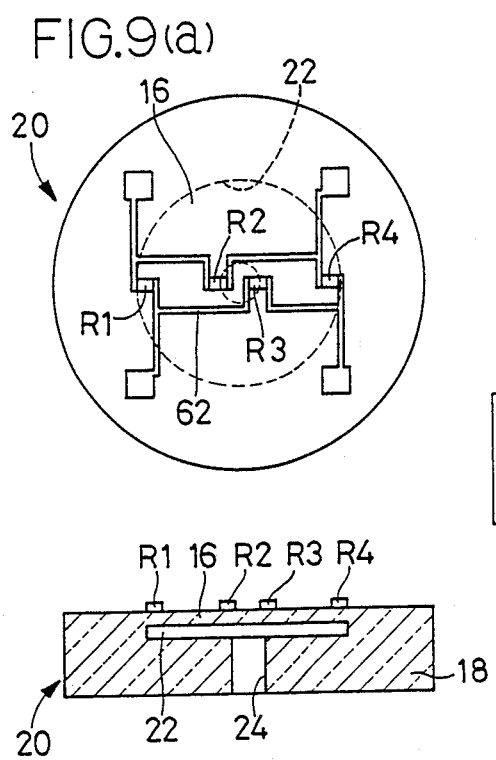

PRESSURE SENSOR

BACKGROUND OF THE INVENTION

1. Field of the Invention

The present invention relates generally to a ceramic pressure sensor, and more particularly to a pressure sensor which has a ceramic diaphragm which is deformed in response to a pressure applied thereto, and at least one resistor which is formed on the diaphragm and whose resistance value varies according to a magnitude of deformation of the diaphragm, and consequently represent the pressure applied to the diaphragm. The present invention also relates to a method of producing a ceramic pressure sensor as indicated above.

2. Discussion of the Prior Art

There is known a pressure sensor or detector of a type wherein resistors connected in a Wheatstone bridge configuration are formed on a diaphragm, which is deformed by a pressure applied thereto. Deformation of the diaphragm results in a certain degree of strain of the resistors, thereby causing a loss of balance of the bridge of the resistors in relation to the pressure applied to the diaphragm. According to this principle, the pressure sensor is capable of measuring a pressure. As a pressure sensor of this type, there is proposed a ceramic pressure sensor which utilizes properties of ceramics, such as high heat resistance, which permits the sensor to measure a pressure at an elevated temperature. Examples of the ceramic sensor are disclosed in SAE Report, 820319 and 860474.

In such a ceramic pressure sensor, a ceramic diaphragm is generally secured on a baseplate, by means of a sealing glass, and the diaphragm is adapted to receive a pressure at one of its opposite surfaces, such that the diaphragm is deformed due to the pressure. As a result, resistors on the deformed diaphragm are given a corresponding strain, which causes a change in the resistance values of the resistors. The pressure applied to the diaphragm is determined by detecting the resistance change of the resistors.

In the conventional ceramic pressure sensors, however, the diaphragm is formed and fired separately from or independently of the baseplate. Namely, the prepared diaphragm is bonded to the separately prepared baseplate by a sealing or bonding material such as a glass. Therefore, there exists a difference in thermal expansion coefficient between the bonding material and the diaphragm, or between the bonding glass and the baseplate. This difference may lead to reducing the strength of the interface between the diaphragm and baseplate, and deteriorating the pressure tightness of the pressure sensor, due to repeated alternate exposures of the sensor to high and low temperatures in pressure measuring cycles. Further, the difference in the thermal expansion coefficient between the bonding material and the diaphragm may unfavorably cause a deformation of the diaphragm and a change in the resistance values of the resistors, even when a pressure is not acting on the diaphragm. Thus, the pressure sensor may have a pressure sensing error, or suffer from lowered accuracy of sensing.

SUMMARY OF THE INVENTION

It is accordingly a first object of the present invention to provide a ceramic pressure sensor which has improved pressure sensing accuracy even when it is used at varying temperatures.

It is a second object of the invention to provide a method suitable for producing such a ceramic pressure sensor.

The first object may be accomplished according to the principle of the present invention, which provides a ceramic diaphragm which is deformable in response to a pressure applied thereto, a ceramic base associated with a periphery of the ceramic diaphragm, for supporting the ceramic diaphragm, and at least one resistor formed on the ceramic diaphragm such that the resistance value of the resistor varies depending upon a magnitude of deformation of the ceramic diaphragm, thereby representing the pressure applied to the diaphragm. The ceramic diaphragm and the ceramic base consist of a co-fired integral body.

Since the ceramic diaphragm and the ceramic base of the ceramic pressure sensor of the present invention consist of a co-fired unitary or integral body which is obtained by co-firing an unfired diaphragm member and an unfired base member, the bonding strength between the ceramic diaphragm and the ceramic base is considerably increased, in the absence of a bonding material such as a bonding or sealing glass as conventionally used. Further, it is not necessary to take account of a difference in the thermal expansion coefficient between the bonding material or glass and the diaphragm and base. In other words, the instant ceramic pressure sensor is free from otherwise possible reduction in the strength at the interface between the diaphragm and the base, and other drawbacks, which may result from the difference in the thermal expansion coefficient. Thus, the instant pressure sensor provides improved pressure tightness.

Furthermore, the bonding of the diaphragm and the base by co-firing of the respective unfired members into the co-fired integral body according to the present invention effectively eliminates deformation of the diaphragm which is experienced on the conventional sensor, due to a difference in the thermal expansion coefficient between the bonding material and the diaphragm and baseplate. Consequently, the instant ceramic pressure sensor assures improved sensing accuracy.

Moreover, the co-fired integral body consisting of the diaphragm portion and the base portion permits reduction in the overall size of the pressure sensor, and in the number of manufacturing steps, whereby the manufacturing efficiency of the sensor is improved, and the manufacturing cost is lowered.

In one form of the pressure sensor of the present invention, the co-fired integral body is obtained by co-firing an unfired laminar body which includes a plurality of unfired formed planar or thick-film ceramic members having respective spaces formed therein. The co-fired integral body has an internal cavity corresponding to the spaces formed in the unfired ceramic members. Where the unfired formed planar ceramic members are used, these member may consist of ceramic green sheets. Where the unfired formed thick-film ceramic members are used, they may be formed by a thick-film printing technique. The internal cavity may preferably has a rounded edge having a predetermined radius of curvature. In this case, the rounded edge is effective to avoid concentration of stresses on the periphery of the diaphragm, and advantageously contributes to improving the pressure tightness of the sensor.

In another form of the pressure sensor of the present invention, the unfired formed ceramic members of the unfired laminar body has at least one insert inserted in the spaces formed therein. Each insert has a suitable volume and is formed of a sublimable material which sublimes and disappears upon firing of the unfired laminar body at a selected sintering temperature. Thus, the internal cavity is formed in the co-fired integral body. As the sublimable material, theobromine and indigo may be preferably used.

In one arrangement of the above form of the invention, each insert has same dimensions as those of a corresponding one of the spaces, so that each insert is snugly fitted in the corresponding space.

In another arrangement of the same form of the invention, the sublimable material sublimes at a temperature higher than a decomposition point of a material contained in the unfired laminar body which decomposes during co-firing of the unfired ceramic members.

The second object of the invention may be achieved according to another aspect of the present invention, which provides a method of producing a ceramic pressure sensor including a ceramic diaphragm which is deformable in response to a pressure applied thereto, a ceramic base associated with a periphery of the ceramic diaphragm for supporting the ceramic diaphragm, and at least one resistor formed on the ceramic diaphragm, resistance value of the resistor varying depending upon a magnitude of deformation of the ceramic diaphragm, and thereby representing the pressure applied to the ceramic diaphragm, the method comprising the steps of: preparing an unfired ceramic diaphragm member which gives, by firing thereof, the ceramic diaphragm; preparing an unfired ceramic base member which gives, by firing thereof, the ceramic base supporting said ceramic diaphragm; preparing an unfired laminar body which includes the unfired ceramic diaphragm and base members; and firing the unfired laminar body to thereby co-fire said unfired ceramic diaphragm member and the unfired ceramic base member, for preparing a co-fired integral body which includes a diaphragm portion formed as the ceramic diaphragm from the unfired ceramic diaphragm member, and a base portion formed as the ceramic base from the unfired base member as the ceramic base, the diaphragm portion and the base portion being integral with each other.

BRIEF DESCRIPTION OF THE DRAWINGS

The above and optional objects, features and advantages of the present invention will become more apparent by reading the following detailed description of presently preferred embodiments of the invention, when considered in connection with the accompanying drawings, in which:

FIGS. 1-5 are views showing different embodiments of the present invention, FIGS. 1(a), 2(a), 3(a), 4(a) and 5(a) being perspective views illustrating laminar structures of various unfired members, FIGS. 1(b), 2(b), 3(b), 4(b) and 5(b) being elevational views in cross section showing co-fired bodies obtained from the unfired laminar structures, and FIG. 5(c) being a cross sectional view taken along line C—C of FIG. 5(a), showing a conical insert;

FIG. 8 is an elevational view in cross section depicting an example of an arrangement of a pressure sensor which incorporates a co-fired body constructed according to the principle of the invention;

FIGS. 9(a) and 9(b) are plane and elevational cross sectional views of the co-fired body of FIG. 8; and FIG. 10 is a diagram showing a bridge circuit formed on the body of FIGS. 8(a) and 8(b).

DETAILED DESCRIPTION OF THE PREFERRED EMBODIMENTS

Figure 5A:
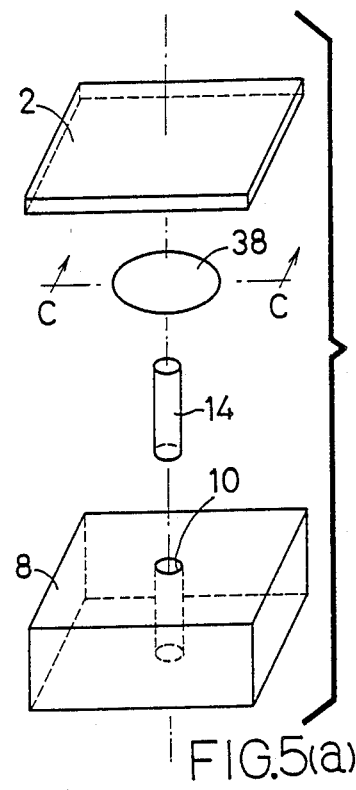

Referring first to the perspective view of FIG. 1(a), there is shown an unfired laminar body which is fired into a co-fired integral body as shown in the cross sectional view of FIG. 1(b). This co-fired integral body constitutes the first preferred embodiment of the present invention.

In FIGS. 1(a) and 1(b), reference numeral 2 designates an unfired formed planar or thick-film ceramic member in the form of an unfired diaphragm member, which is fired into a diaphragm portion 16 that is deformable in response to a pressure applied thereto. Reference numeral 4 designates an unfired formed planar ceramic member in the form of an unfired spacer member which has a circular opening 6 formed in a central portion thereof. Further, reference numeral 8 designates an unfired formed planar or cubic ceramic member in the form of an unfired base member which has a through hole 10 formed in a central portion thereof. As described below, the circular opening 6 and the through hole 10 communicate with each other after the co-firing of the unfired ceramic members 2, 4, 8 of the unfired laminar body.

When the unfired diaphragm member 2, unfired spacer member 4 and unfired base member 8 are assembled into the unfired laminar body of FIG. 1(a), the circular opening 6 and the through hole 10 are filled with a sublimable disk insert 12 and a sublimable rod insert 14, respectively. Described more specifically, the disk insert 12 in the form of a disk and the rod insert 14 in the form of a round rod have substantially the same dimensions as the opening 6 and hole 10, respectively, so that the inserts 12 and 14 are snugly fitted in the respective opening 6 and hole 10. The disk insert 12 and the rod insert 14 are formed substantially of a sublimable material. With the opening and hole 6, 10 filled with these inserts 12, 14, the unfired members 2, 4, 8 are superposed on each other into the unfired laminar body. Subsequently, the laminar body is fired in an ordinary manner at a suitable sintering temperature. Namely, the diaphragm member 2, spacer member 4 and base member 8 are co-fired into a co-fired integral body 20 as shown in FIG. 1(b), which consists of the diaphragm portion 16, and a base portion 18 integral with the diaphragm portion 16. The diaphragm portion 16 is deformable depending upon a magnitude of a pressure applied thereto, and the base portion 18 functions as a substrate to which the periphery of the diaphragm portion 16 is bonded, whereby the diaphragm portion 16 is supported by the base portion 18. During the co-firing process of the unfired laminar body, the disk and rod inserts 12, 14 disappear due to sublimation. As a result, there are formed a circular cavity 22 corresponding to the disk insert 12, and communication passage 24 corresponding to the rod insert 14. The circular cavity 22 communicates with an ambient atmosphere through the communication passage 24.

The thus prepared and constructed co-fired integral body 20 may be suitably used to fabricate a ceramic pressure sensor for detecting or determining a level of a pressure to be measured. As described later in detail, at least one resistor is formed on an outer surface of the diaphragm portion 16. The pressure to be measured is applied to an inner surface of the diaphragm portion 16, through the communication passage 24 and the cavity 22. The pressure acting on the diaphragm portion 16 deforms the same, thereby causing a change in the resistance values of the resistor. The level of the pressure may be determined based on this change in the resistance value. The resistor may be formed before, during or after the co-firing of the unfired laminar body. Namely, a suitable material for the resistor may be applied to the outer surface of the unfired diaphragm member 2 before or during the co-firing operation. The material applied may be an electrical resistive material, or a material which becomes an electrical resistive material after the firing thereof. Where the resistor is formed on the co-fired integral body 20, an electrical resistive material is applied to the surface of the diaphragm portion 16. A suitable glass or ceramic overcoat may be formed on the resistor, for protecting the resistor.

The pressure sensor using the thus constructed co-fired integral ceramic body 20 does not contain a joint formed by any conventionally used bonding material such as a glass. That is, the diaphragm portion 16 and the base portion 18 constitute the integrally sintered one-piece body 20, wherein the peripheral part f the diaphragm portion 16 is integral with the upper part of the base portion 18. In the absence of a bonding material, the bonding strength of the interface between the diaphragm and base portions 16, 18 is considerably greater than that of the conventional joint formed by a bonding glass, for example. Further, the absence of a bonding material provides for a freedom from otherwise possible troubles, such as separation or flake-off of the diaphragm portion 16, due to a repetitive thermal hysteresis during use of the sensor at varying low and high temperatures. Therefore, the pressure tightness of the sensor is remarkably improved. Moreover, the diaphragm portion 16 is free from the conventionally encountered deformation due to a difference in the thermal expansion coefficient, whereby the pressure sensing accuracy of the sensor is enhanced.

The ceramic materials for the unfired diaphragm, spacer and base members 2, 4, 8 which give the co-fired integral body 20 may be selected from known ceramic materials which are conventionally used to produce ceramic pressure sensors. For instance, alumina, zirconia and mullite are preferably used. By using the selected ceramic materials, the unfired ceramic members 2, 4, 8 are formed into planar or thick film sheets, by a known method. According to the present invention, the unfired formed ceramic members 2, 4, 8 are generally made of a same ceramic material. Usually, the selected ceramic material is used in the form of a powder which contains a binder and a plasticizer for increasing the formability of the material. Further, the ceramic powder includes other suitable agents such as a sintering aid. The prepared powder mixture is formed into a suitable ceramic shape, for example, a green sheet prepared by a known method, or a thick-film sheet prepared by a commonly practiced thick-film printing technique.

The circular opening 6 and the through hole 10 formed in the unfired spacer member 4 and the unfired base member 8 are filled with the disk insert 12 and the rod insert 14, respectively, so that the circular cavity 22 and the communication passage 24 may be formed as required, in the co-fired integral body 20. However, if the inserts 12, 14 will not disappear after the firing of the unfired laminar body, the inserts 12, 14 should be removed from the co-fired integral body 20, but the inserts cannot be removed after the firing. For this reason, the disk and rod inserts 12, 14 should be made principally of a material which can be burnt out during a firing operation, so that the material of the inserts 12, 14 is not left in the cavity 22 and the passage 24. Further, the inserts 12, 14 should be suitably formed masses which can withstand a force which is exerted on the unfired spacer and base members 4, 8 when the unfired members 2, 4, 8 are compacted into the unfired laminar body. In other words, the inserts 12, 14 should function to prevent the unfired ceramic material from being displaced into the circular opening 6 and the through hole 10 when the unfired members 2, 4, 8 are superposed on each other under pressure.

As described above, the disk and rod inserts 12, 14 used in the present embodiment are made substantially of a sublimable material, which will not generally sublime at a room temperature. It is desirable that the sublimable material is only slightly soluble or insoluble in an organic solvent such as ether, which is used as a solvent for a paste of the sublimable material. In particular, it is preferable to use a sublimable material which sublimes at a temperature higher than a decomposition point of additives such as a binder and a plasticizer that are contained in the unfired laminar body 2, 4, 8 and decompose during firing of the unfired body. For example, theobromine, indigo, 1, 5-diaminoanthraquinone, hexabromobenzene, and naphthacene are particularly preferred examples of the sublimable material. Like the ceramic powder used for the unfired ceramic members 2, 4, 8, the selected sublimable material is mixed with the above-indicated additives such as a binder and a plasticizer, and the mixture is formed into the disk and rod inserts 12, 14 having the appropriate shapes and volumes.

The disk and rod inserts 12, 14 formed principally of the sublimable material as indicated above have substantially the same dimensions and configurations as the opening and hole 6, 10, and are therefore snugly fitted in these voids 6, 10, so that the portions of the unfired laminar ceramic body (2, 4, 8) which define the voids will not be displaced into the voids, while the laminar ceramic body is formed under compacting pressure. However, if the inserts 12, 14 are able to prevent the above displacement of the unfired body (2, 4, 8), the inserts need not be a solid mass, i.e., may be a hollow or otherwise constructed or shaped mass.

While one form of the co-fired integral body usable for a pressure sensor has been described above, it is to be understood that the present invention is not limited to the illustrated construction, but may be otherwise embodied. Some modified embodiments will be described by reference to FIGS. 2(a) and 2(b) and the following figures.

A second embodiment shown in FIGS. 2(a) and 2(b) is different from the first embodiment, in that an insert is not made of a sublimable material. Described more specifically, an unfired base member 26 also serves as the spacer member 4 used in the first embodiment, and the insert can be removed from the unfired laminar body (2, 26). Therefore, the insert need not be a sublimable material. For instance, the insert may be a cylindrical core 28, which is snugly received in a comparatively large cylindrical bore 30 formed in the unfired base member 30, before the unfired diaphragm member 2 is superposed on the unfired base member 26 under suitable pressure, to produce the unfired laminar body.

Then, the cylindrical core 28 is removed from the prepared unfired laminar body (2, 26), and the laminar body is co-fired into the co-fired integral body 20 as shown in FIG. 2(b). The produced integral body 20 has a cylindrical cavity 32 which communicates with an ambient atmosphere. Thus, the co-fired integral body 20 consists of the diaphragm portion 16 and the base portion 18 which are physically integral with each other.

A third embodiment shown in FIGS. 3(a) and 3(b) is different from the preceding embodiments, characterized in that an unfired base member consists of a plurality of unfired planar base members 34a, 34b ... 34n. An unfired laminar body is formed by superposing the unfired spacer member 4 on the superposed planar base members 34, and superposing the unfired diaphragm member 2 on the unfired spacer member 4. As in the embodiment of FIG. 1, the disk insert 12 is inserted in the circular opening 6 in the spacer member 4, and the rod insert 14 is inserted in a through hole which consists of a plurality of holes 10a, 10b ... 10n formed through the respective planar members 34a, 34b ... 34n.

The thus formed unfired laminar body is co-fired into the co-fired integral body 20 as illustrated in FIG. 3(b), similar to that of the first embodiment. In the instant third embodiment, the production efficiency can be improved if the diaphragm member 2, spacer member 4 and planar base members 34a, 34b ... 34n all have the same thickness.

A fourth embodiment shown in FIGS. 4(a) and 4(b) manifests an example of a co-fired integral 20 having an enclosed internal cavity 22. As indicated in FIG. 1(a), this embodiment uses an unfired base member 36 which does not have a through hole for communication of the circular opening 6 with an ambient atmosphere, contrary to the preceding embodiments.

On this unfired base member 36, there are superposed the unfired spacer member 4 with the disk insert 12 received in the opening 6, and the unfired diaphragm member 2. The thus obtained laminar body is co-fired into the co-fired integral body 20 as indicted in FIG. 1(b). The internal circular cavity 22 formed in the integral body 20 does not communicate with the ambient atmosphere.

The pressure sensor using the co-fired integral body 20 of FIG. 4(b) is adapted such that the pressure to be detected is applied to only the outer surface of the diaphragm portion 16, unlike the previous embodiments.

Figure 5B:
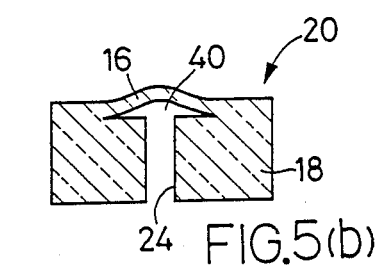
Figure 5C:
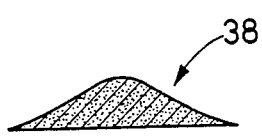

In a fifth embodiment of the present invention shown in FIGS. 5(a), 5(b) and 5(c), an unfired spacer member as indicated at 4 in the previous embodiments is not used. Instead, a sublimable cone insert 38 having a cross sectional shape as indicated in FIG. 5(c) is interposed between the unfired diaphragm and base members 2, 8. An unfired laminar body with the cone insert 38 sandwiched by and between the members 2, 8 is co-fired into a co-fired integral body 20 as shown in FIG. 5(b). This integral body 20 has a conical cavity 40 corresponding to the cone insert 38. In the instant embodiment, the diaphragm portion 16 is convexed at its central part, following the profile of the cone insert 38, and the periphery of the convexed part of the diaphragm portion 16 is formed integrally with the base portion 18.

Figure 6A:
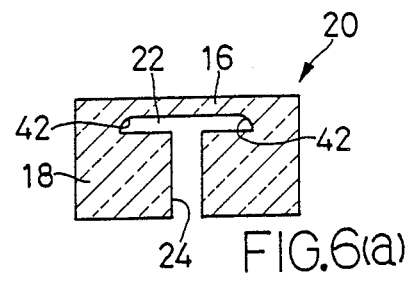
FIG. 6(a) is an elevational view in cross section of a co-fired body according to a further embodiment of the invention, illustrating a modified circular cavity which has rounded edges.
Figure 6B:
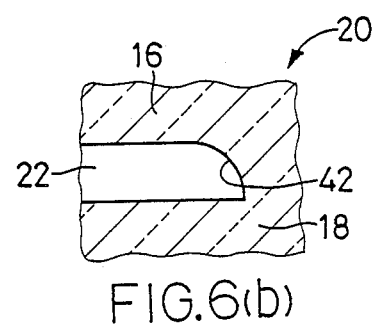
FIG. 6(b) is a fragmentary view showing in enlargement of the circular cavity of FIG. 6(a)
Figure 7A:
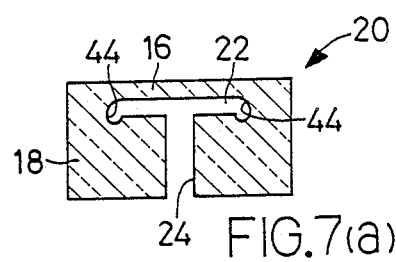
FIGS. 7(a) and 7(b) are views corresponding to those of FIGS. 6(a) and 6(b), showing another modified circular cavity according to a still further embodiment of the invention.
Figure 7B:
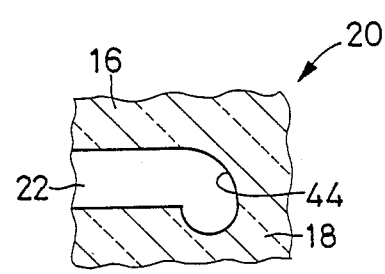

The co-fired integral bodies 20 constructed as described above according to the principle of the present invention may be advantageously modified such that the internal circular cavity 22 located adjacent to the diaphragm portion 16 is formed with a rounded edge having a suitably selected radius of curvature, as indicated at 42 in FIGS. 6(a), 6(b) and FIGS. 7(a) and 7(b). Stated more particularly, the circular cavity 22 is rounded to a suitable radius of curvature, at the upper edge adjacent to the diaphragm portion 16, as illustrated in FIGS. 6(a) and 6(b). In an example of FIGS. 7(a) and 7(b), the upper and lower edges of the circular cavity 22 are rounded to different radii of curvature, as indicated at 44.

The rounded edges 42, 44 of the circular cavity 22 which defines the diaphragm portion 16 of the co-fired integral body 20 effectively restrict or prevent concentration of stresses on the periphery of the diaphragm portion 16, thereby increasing the durability or pressure tightness of the integral body 20 and consequently the pressure sensor.

FIG. 8 illustrates an example of a structural arrangement of a pressure sensor using the co-fired integral body 20 wherein the diaphragm and base portions 16, 18 are integral with each other. The integral body 20 is accommodated within a housing body 50 and covered by a lid member 52. The three members 20, 50, 52 are maintained in the assembled state by a caulking member 54 which engages the housing body 50 and the lid member 52, so that the peripheral part of the integral body 20 is pressed by the lid member 52 against the housing body 50. An O-ring 56 is interposed between the lower surface of the integral body 20 and the facing inner surface of the housing body 50, in order to provide a sealing therebetween. The housing body 50 has a pressure hole 58 formed therethrough such that the hole 58 communicates with the communication passage 24 and circular cavity 22 formed in the integral body 20. In operation, the pressure sensor is disposed such that the pressure hole 58 is open in a fluid whose pressure is measured. Thus, the pressure of the introduced fluid in the cavity 22 acts on the inner surface of the diaphragm portion 16.

On the outer surface of the diaphragm portion 16 of the co-fired integral body 20, there are integrally formed four resistors R1, R2, R3 and R4, for example, which are connected in a bridge configuration as known in the art, such as a Wheatstone bridge circuit. With the diaphragm portion 16 deformed by the pressure of the fluid introduced through the pressure hole 58, the resistance values of the resistors R1-R4 decrease or increase, and an output of the bridge circuit is fed to an external device through a lead cable 60 connected to the circuit. The resistors R1-R4 are formed of a suitable electrically conductive material selected from metals such as Pt, Au, Ag and Pd, or alloys or oxides of these metals, or electrically conductive oxides such as $RuO_2$ or $Bi_2Ru_2O_7$.

The arrangement of the four resistors R1-R4 which are thus formed on the diaphragm portion 16 of the integral body 20 and connected to each other by conductors 62 are shown in FIGS. 9(a) and 9(b). The bridge circuit constituted by the resistors R1-R4 and conductors 62 may be a known configuration. An example of the bridge circuit is illustrated in FIG. 10. Reference numeral 64 in FIG. 10 indicates a power source.

While the present invention has been described in its presently preferred embodiments with a certain degree of particularity, it is to be understood that the invention is by no means limited to the precise details of the illustrated embodiments, but may be embodied with various changes, modifications and improvements, which may occur to those skilled in the art, without departing from the spirit and scope of the invention defined in the following claims.

What is claimed is:

1. A pressure sensor comprising:
   a ceramic diaphragm which is deformable in response to a pressure applied thereto;
   a ceramic base associated with a periphery of said ceramic diaphragm, for supporting said ceramic diaphragm;
   at least one resistor formed on said ceramic diaphragm, resistance value of said resistor varying depending upon a magnitude of deformation of said ceramic diaphragm, and thereby representing said pressure applied to said ceramic diaphragm; and
   said ceramic diaphragm and said ceramic base consisting of a co-fired integral body.

2. A pressure sensor according to claim 1, wherein said co-fired integral body is obtained by co-firing an unfired laminar body which includes a plurality of unfired formed planar or thick-film ceramic members having respective spaces formed therein, said co-fired integral body having an internal cavity corresponding to said spaces formed in said unfired ceramic members.

3. A pressure sensor according to claim 2, wherein said unfired formed ceramic members of said unfired laminar body have at least one insert inserted in said spaces, said at least one insert being formed of a sublimable material which sublimes and disappears upon firing of said unfired laminar body, whereby said internal cavity is formed in said co-fired integral body.

4. A pressure sensor according to claim 3, wherein each of said at least one insert has same dimensions as those of a corresponding one of said spaces, so that said each insert is snugly fitted in said corresponding space.

5. A pressure sensor according to claim 3, wherein said sublimable material sublimes at a temperature higher than a decomposition point of a material contained in said unfired laminar body which decomposes during co-firing of said unfired ceramic members.

6. A pressure sensor according to claim 3, wherein said sublimable material consists of theobromine or indigo.

7. A pressure sensor according to claim 2, wherein said unfired formed planar ceramic members consist of ceramic green sheets.

8. A pressure sensor according to claim 2, wherein said unfired formed thick-film ceramic members are formed by a thick-film printing technique.

9. A pressure sensor according to claim 2, wherein said internal cavity has a rounded edge having a predetermined radius of curvature.

* * * * *